United States Patent
Koonmen et al.

(10) Patent No.: US 6,424,457 B1
(45) Date of Patent: Jul. 23, 2002

(54) OPTICAL AMPLIFIERS AND METHODS FOR MANUFACTURING OPTICAL AMPLIFIERS

(75) Inventors: James P. Koonmen, Santa Clara; James W. Sulhoff, Los Gatos, both of CA (US); Chia-Chi Wang, Hillsborough; Paul F. Wysocki, Flemington, both of NJ (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/729,085

(22) Filed: Dec. 5, 2000

Related U.S. Application Data

(60) Provisional application No. 60/238,018, filed on Oct. 6, 2000.

(51) Int. Cl.⁷ .............................................. H04B 10/13
(52) U.S. Cl. ................. 359/337.1; 359/341.1; 359/337.4
(58) Field of Search ........................ 359/341.42, 337, 359/337.1, 110, 109; 372/6

(56) References Cited

U.S. PATENT DOCUMENTS

| | | | |
|---|---|---|---|
| 4,309,105 A | * 1/1982 | Lebduska | 356/73.1 |
| 4,906,949 A | * 3/1990 | Pocholle | 330/4.3 |
| 5,115,338 A | * 5/1992 | DiGiovanni | 359/337 |
| 5,471,342 A | * 11/1995 | Junginger | 359/341 |
| 5,488,475 A | * 1/1996 | Friebele | 356/352 |
| 5,502,591 A | * 3/1996 | Semenkoff | 359/341 |
| 5,535,870 A | * 7/1996 | Shigamatsu | 359/341 |
| 5,673,280 A | 9/1997 | Grubb et al. | 372/3 |
| 5,859,938 A | 1/1999 | Nabeyama et al. | 385/24 |
| 5,898,001 A | * 4/1999 | Braun | 385/24 |
| 5,900,969 A | 5/1999 | Srivastava et al. | 359/337 |
| 5,940,208 A | * 8/1999 | Blaszyk | 359/341 |
| 5,963,361 A | * 10/1999 | Taylor | 359/337 |
| 6,005,695 A | * 12/1999 | Roberts | 359/110 |
| 6,049,413 A | 4/2000 | Taylor et al. | 359/337 |

(List continued on next page.)

FOREIGN PATENT DOCUMENTS

| | | |
|---|---|---|
| WO | WO 00/14909 | 3/2000 |
| WO | WO 00/49721 | 8/2000 |

OTHER PUBLICATIONS

Becker, P.C. et al. "Erbium–doped Fiber Amplifiers: Fundamentals and Technology." Academic Press, San Diego, 1999. p. 226–234; 263–295.*

Bbjarklev, A. "Optical Fiber Amplifiers: Design and System Applications." Artech House, Boston, 1993. pp. 103–107; 123–127.*

(List continued on next page.)

*Primary Examiner*—Thomas H. Tarcza
*Assistant Examiner*—Andrew R. Sommer
(74) *Attorney, Agent, or Firm*—Fish & Neave; G. Victor Treyz

(57) ABSTRACT

Optical amplifiers and methods for manufacturing optical amplifiers are provided that allow amplifiers to be fabricated to match design expectations. Optical amplifiers may be manufactured by assembling passive optical components in the amplifier before assembling active optical components such as doped fiber coils. Passive losses may then be characterized and used to calculate the lengths of the fibers that should be used in the amplifier gain stages. Following corrections to the nominal doped-fiber lengths based on the measured passive losses, the passive and active components of the amplifier may be assembled and characterized. Final corrections may be made to the amplifier assembly based on these characterizations. For example, the lengths of one or more of the doped fibers may be adjusted. If desired, such length adjustments may be made to fiber coils in the mid-stage portion of the amplifier, so that the impact on the operating characteristics of the amplifier are minimized.

12 Claims, 9 Drawing Sheets

U.S. PATENT DOCUMENTS

| | | | | |
|---|---|---|---|---|
| 6,061,171 | A | | 5/2000 | Taylor et al. ............... 359/341 |
| 6,069,731 | A | * | 5/2000 | Bayart ......................... 359/341 |
| 6,081,366 | A | | 6/2000 | Kidorf et al. ............... 359/341 |
| 6,094,298 | A | | 7/2000 | Luo et al. .................... 359/346 |
| 6,101,423 | A | * | 8/2000 | Csipkes ....................... 700/117 |
| 6,115,174 | A | | 9/2000 | Grubb et al. ............... 359/334 |
| 6,134,047 | A | | 10/2000 | Flood et al. ................ 359/341 |
| 6,140,920 | A | * | 10/2000 | Roberts ....................... 340/514 |
| 6,166,851 | A | * | 12/2000 | Flintham ..................... 359/341 |
| 6,178,038 | B1 | | 1/2001 | Taylor et al. ............... 359/341 |
| 6,198,572 | B1 | | 3/2001 | Sugaya et al. .............. 359/337 |
| 6,215,581 | B1 | | 4/2001 | Yadlowsky ................. 359/337 |
| 6,246,513 | B1 | * | 6/2001 | Bayart ......................... 359/341 |
| 6,259,543 | B1 | * | 7/2001 | Golovochenko ............ 359/110 |

OTHER PUBLICATIONS

Desurivire, E. "Erbium–Doped Fiber Amplifiers: Principles and Applications." John Wiley & Sons, Inc. 1994, pp. 382–399.*

Sun et al. "Optical Fiber Amplifiers for WDM Optical Networks" Bell Labs Journal, p. 187–206, Jan.–Mar., 1999.

Sun et al. "Ultra Wide Band Erbium–Doped Fiber Amplifier with 80nm of Bandwidth" OSA Trends in Optics and Photonics, vol. 16 1997.

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Takeda et al. "Active Gain Tilt Equalization by Preferentially 1.43 $\mu$m– or 1.48$\mu$m– Pumped Raman Amplification" OSA Optical Amplifiers and their Applications, vol. 30, p. 101–105 (1999).

Kahui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

Masuda "Review of Wideband Hybrid Amplifiers" $25^{th}$ Optical Fiber Communication Conference, Technical Digest, p. 2–4, (Mar. 7, 2000).

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

* cited by examiner

OPTICAL AMPLIFIERS AND METHODS FOR MANUFACTURING OPTICAL AMPLIFIERS

This application claims the benefit of provisional patent application No. 60/238,018, filed Oct. 6, 2000.

BACKGROUND OF THE INVENTION

The present invention relates to fiber-optic communications, and more particularly, to optical amplifiers and methods for manufacturing optical amplifiers for use in optical communications networks.

In optical networks that use wavelength division multiplexing, multiple wavelengths of light are used to support multiple communications channels on a single fiber. Optical amplifiers are used in such networks to amplify optical signals that have been subject to attenuation over multi-kilometer fiber-optic links. A typical amplifier may include erbium-doped fiber amplifier components that are pumped with diode lasers. The erbium-doped fiber amplifier stages increase the strength of the optical signals being transmitted over the fiber-optic links.

There is typically a lot-to-lot variation in the gain characteristics of doped erbium fiber. There are also typically variations in the losses associated with passive optical amplifier components. These variations and variations that arise in the losses associated with assembling erbium fiber coils and other components to form a completed amplifier adversely affect the ability to manufacture amplifiers with operating characteristics that precisely match design expectations.

It is an object of the present invention to provide methods for assembling optical amplifier systems with operating characteristics that match design expectations.

It is also an object of the present invention to provide optical amplifier arrangements that may be manufactured to match design expectations.

SUMMARY OF THE INVENTION

These and other objects of the invention are accomplished in accordance with the present invention by providing optical amplifiers arrangements and methods for manufacturing optical amplifiers that allow amplifiers to be fabricated to match design expectations.

With one approach, optical amplifiers may be manufactured by assembling the passive optical components in the amplifier, before assembling the active optical components such as the doped fiber coils. Passive losses may then be characterized and used to calculate the lengths of the fibers that should be used in the amplifier gain stages.

Following corrections to the nominal doped-fiber lengths based on the measured passive losses, the passive and active components of the amplifier may be assembled and characterized. An optical measurement system may be used to measure the performance of the amplifier assembly at this stage of the manufacturing process. The measurement system may use two or more optical wavelengths, so that any tilt in the gain spectrum of the amplifier assembly may be characterized.

Final corrections may be made to the amplifier assembly based on the results of the gain tilt measurements. For example, the lengths of one or more of the doped fibers may be adjusted by adding or removing segments or doped fiber. If desired, such length adjustments may be made to fiber coils in the mid-stage portion of the amplifier, so that the impact on the operating characteristics of the amplifier are minimized. If the fiber coil length is to be shortened, an appropriate segment of fiber may be removed from a mid-stage coil. If the fiber coil length is to be lengthened, an additional segment of doped fiber may be spliced to the mid-stage coil.

If desired, the process of adjusting the length of the fiber coils may be anticipated when constructing the initial amplifier assembly. This may allow, for example, the final fiber length correction to always be a fiber-length reduction or to always be a fiber-length addition. The amplifier may also be configured so that some fiber-length changes will involve length reductions and some fiber-length changes will involve length additions.

The temperature of the fiber coils used in the amplifier may be regulated using a temperature-controlled fiber coil housing. If desired, segments of fiber that are added to the amplifier after the coils have been mounted in the housing may be spliced into the main fiber path of the amplifier at a location outside of the housing.

For some applications it may be desirable to assemble all of the passive and active optical components of the amplifier at once based on a nominal design. Length changes may then be made to the fiber coils to correct for variations from the design expectation of the amplifier.

The amplifier may use a variable optical attenuator. The amount of attenuation contributed by the variable optical attenuator can be used to adjust the tilt of the amplifier gain spectrum.

The amplifier may use a nominal design in which the variable optical attenuator is set to produce a loss of 0 dB. The performance of the amplifier may then be optimized during the manufacturing process by adjusting the length of one or more of the active fiber coils or by adjusting the loss setting of the variable optical attenuator.

Another approach involves using a nominal design in which the variable optical attenuator is set to produce a small loss (e.g., 1–2 dB). After the performance of the amplifier assembly is characterized, the setting of the variable optical attenuator may be adjusted to produce more or less attenuation and thereby change the gain tilt to match the design expectation for the amplifier. With this approach, it may be possible to manufacture the amplifier within design tolerances without changing the lengths of the fiber coils or without changing the lengths of the fiber coils as much as would otherwise be required.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
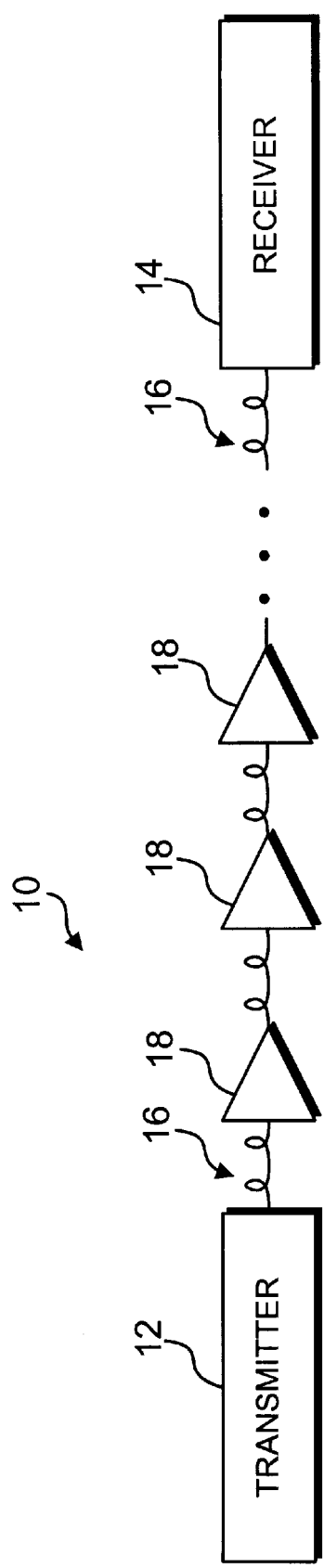
FIG. 1 is a schematic diagram of an illustrative optical communications link using optical amplifiers constructed in accordance with the present invention.

An illustrative optical communications link 10 in accordance with the present invention is shown in FIG. 1. A transmitter 12 may transmit information to a receiver 14 over a series of fiber links. Each fiber link may include a span 16 of optical fiber. Fiber spans may be on the order of 40–120 km in length for long-haul networks or may be any other suitable length for use in signal transmission in an optical communications network.

As optical signals travel along the optical fibers 16, signal strength is attenuated. Optical amplifiers 18 may therefore be used to amplify the optical signals between successive spans of fiber. Optical amplifiers 18 may also be used in other network locations if desired.

The communications link of FIG. 1 may be used to support wavelength-division-multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 GHz (OC-192). The carrier wavelengths that are used may be in the vicinity of 1530–1560 nm. These are merely illustrative system characteristics. If desired, more channels may be provided (e.g., hundreds of channels), signals may be modulated at faster data rates (e.g., at approximately 40 GHz for OC-768), and a wider range of carrier wavelengths may be supported (e.g., 1480–1610 nm).

Figure 2:
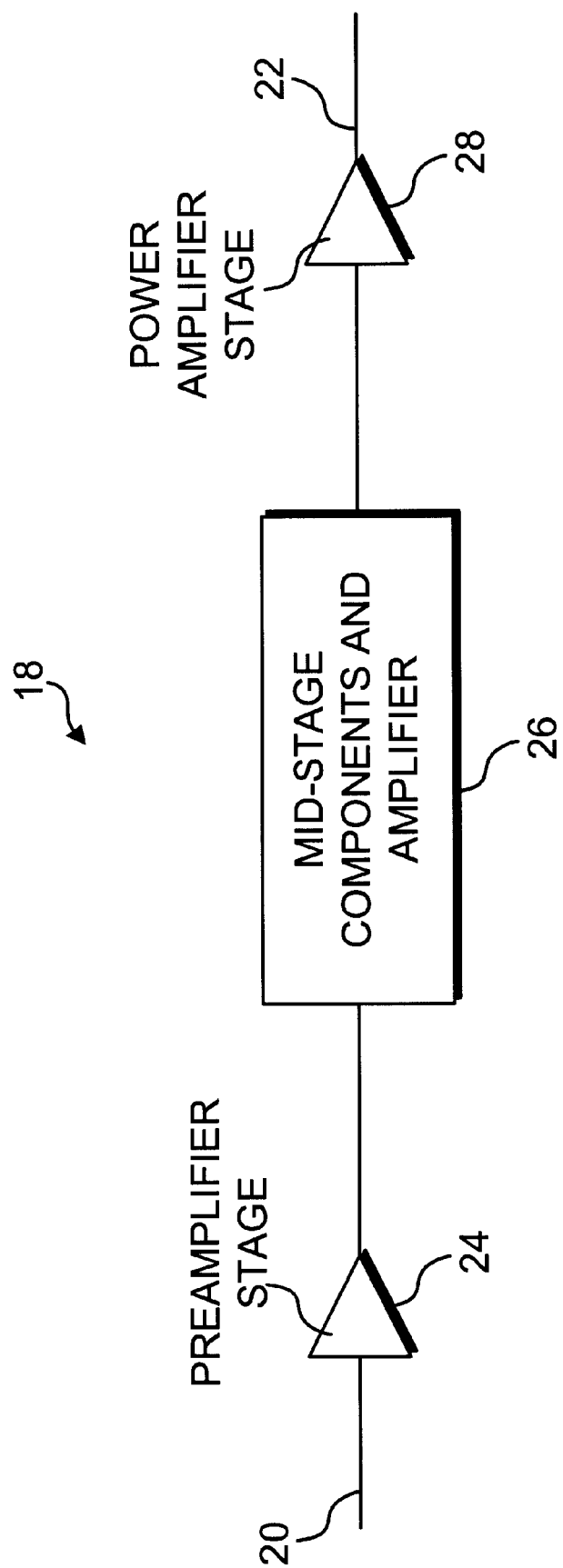
FIG. 2 is a schematic diagram of an illustrative optical amplifier showing the location of the amplifier's mid-stage in accordance with the present invention.

An illustrative amplifier 18 is shown in more detail in FIG. 2. Optical input signals may be provided to input fiber path 20. Amplified output signals from amplifier 18 may be provided at output fiber path 22.

Preamplifier stage 24 may be used to amplify weak optical signals using low-noise optical components. Mid-stage components and amplifier 26 may be used to condition and amplify the optical output signals received from stage 24. Mid-stage 26, for example, may include a dispersion compensation module to reduce the effects of chromatic dispersion in fiber spans 16, may include a variable optical attenuator to allow amplifier 18 to operate under a wide variety of input power loading conditions, may include a gain equalization filter to flatten or otherwise shapes the optical gain spectrum of amplifier 18, etc.

A power stage 28 may be used to increase the optical signal strength of the optical signals received from mid-stage 26.

The amplifier portions of stages 24, 26, and 28 may be based on one or more coils (lengths) of rare-earth doped fiber. The coils may, for example, be one or more erbium-doped fiber coils each of which is several to many meters in length. If desired, other amplifier components (e.g., semiconductor amplifiers) may be used in one or more of stages 24, 26, and 28.

Figure 3:
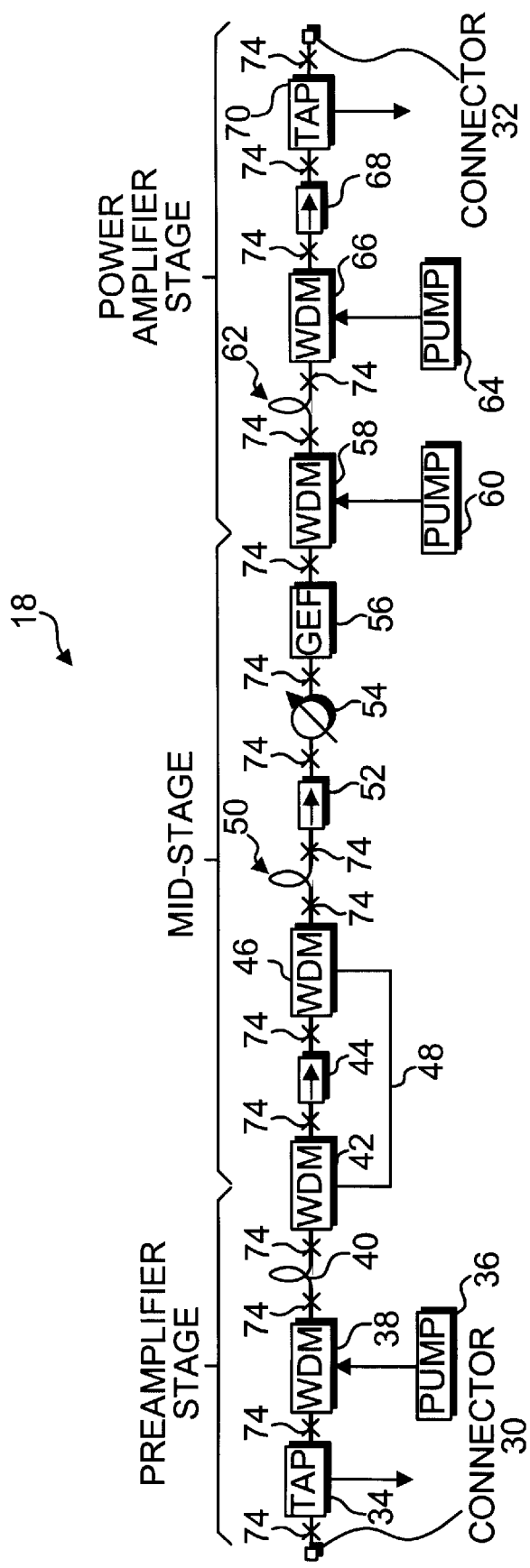
FIG. 3 is a schematic diagram of an illustrative optical amplifier in accordance with the present invention.

An illustrative amplifier 18 is shown in more detail in FIG. 3. Input signals from a fiber span 16 may be provided to input connector 30. Amplified output signals may be provided at output connector 32. Connectors 30 and 32 may be, for example, FC/APC (angle polished) connectors or any other suitable connectors. A tap 34 may be used in amplifier 18 to monitor input power. A tap 70 may be used to monitor output power.

Gain may be provided using rare-earth-doped fiber coils such as erbium-doped fiber coils 40, 50, and 62. In general, an optical amplifier such as optical amplifier 18 may have one, two, three, four, five, or more than five coils. The amplifier of FIG. 3 has three coils, but this is merely illustrative.

Coils 40 and 50 may be pumped by pump 36. Pump 36 may be any suitable source of pumping light, such as one or more laser diodes operating at wavelengths such as 980 nm or 1480 nm, a cladding-pumped Raman laser, or any other suitable source.

A pump coupler such as a wavelength division multiplexing coupler 38 or any other suitable coupler may be used to couple pump power from pump 36 into coil 40. Residual pump power from coil 40 may be separated from the main fiber path using coupler 42 and provided to coil 50 via bypass fiber 48 and coupler 46. An isolator 44 may be used to prevent backwards-propagating light due to spontaneous emission in coil 50 from adversely affecting the noise figure in coil 40.

A variable optical attenuator 54 may be used to insert varying amounts of optical attenuation into the main fiber path through amplifier 18. Gain equalization filter 56 may be used to smooth or flatten the gain spectrum of amplifier 18 to compensate for the natural gain spectrum of coils 40, 50, and 62.

Coil 62 may be pumped by pumps 60 and 64. Pump light from pump 60 may be coupled into coil 62 using coupler 58. Pump light from pump 64 may be coupled into coil 62 using coupler 66.

An isolator 52 may be used to prevent light from pump 64 and spontaneous emission noise from coil 62 from entering coil 50. An isolator 68 may be used to prevent backscattered output signals from entering coil 62.

Coil 40 provides amplification for the preamplifier portion of amplifier 18. Coil 50 provides mid-stage amplification. Coil 62 provides amplification for the power stage of amplifier 18. If desired, additional coils may be added to any of the portions or stages of amplifier 18. In general, components that contribute losses should be placed in the mid-stage portion of amplifier 18, so that any impact on the noise figure characteristics of amplifier 18 is minimized.

Fiber splices 74 may be made using any suitable splicing equipment such as a fusion splicer. Although the loss per splice is typically low (e.g., less than 0.01 dB per splice), losses due to splices 74 may vary somewhat between amplifiers. The losses associated with passive components such as taps 34 and 70, couplers 38, 42, 46, 58, and 66, gain equalization filter 56, variable optical attenuator 54, and isolators 44, 52, and 68 may also vary due to normal manufacturing variations during their construction. The doped fiber in coils 40, 50, and 62 may vary from lot to lot, so that the gain provided by a given length of fiber may vary from its nominal level.

Because of the variations in the characteristics of the components of amplifier 18, it may be difficult or impossible to construct an amplifier 18 that meets its nominal design characteristics without testing and making corrections during the manufacturing process. When the components of amplifier 18 are first assembled, there may be an undesirable tilt in the gain spectrum of amplifier 18 (i.e., the gain may increase or decrease as a function of wavelength). Gain tilts of this type may be corrected by adjusting the lengths of one or more of the amplifier coils during the process of manufacturing amplifier 18. As an example, gain tilt in a fiber amplifier having a total coil length of 70 meters may generally be corrected by making fiber length adjustments on the order of one meter or less.

Any adjustments that are made to the lengths of the active fiber coils in amplifier 18 are preferably made in the midstage, because this will generally lessen the impact of such changes on the operating characteristics of the amplifier. If desired, however, the fiber-length adjustments may be made to input stage coils or output stage coils or any suitable combination of coils.

Figure 4:
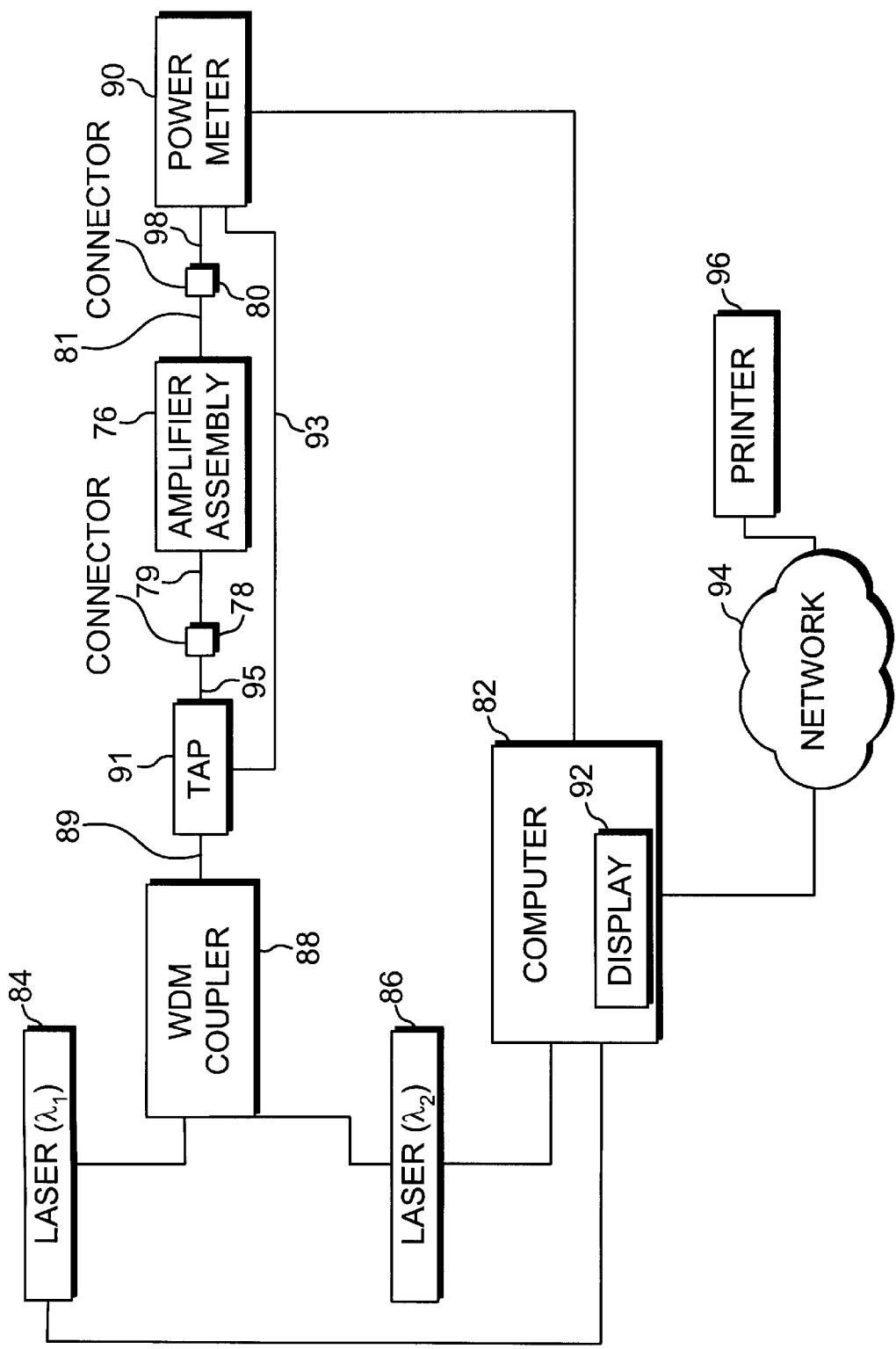
FIG. 4 is a schematic diagram of an illustrative optical measurement system for characterizing optical amplifier assemblies in accordance with the present invention.

An illustrative optical measurement system that may be used to characterize amplifiers during the manufacturing process is shown in FIG. 4. The system of FIG. 4 may be used to measure the gain associated with active components such as fiber laser coils and the losses associated with passive components. As shown in FIG. 4, an amplifier assembly 76 may be connected to the measurement apparatus using connectors 78 and 80. Connectors 78 and 80 may be FC/APC connectors or any other suitable connectors. If desired, amplifier assembly 76 may be coupled to the measurement apparatus without using connectors. For example, input fiber 79 and output fiber 81 may be optically coupled to the measurement apparatus using free-space optics.

The measurement system of FIG. 4 may be controlled using a computer 82 or any other suitable electronic controller. Computer 82 may control light sources such as lasers 84 and 86. Lasers 84 and 86 may be diode lasers operating at wavelengths in different portions of the gain spectrum of the amplifier. Gain tilt may be determined by measuring the amount of gain at either end of the spectrum. Passive losses (e.g., losses due to fiber splices and passive optical components) may be measured using one wavelength. If desired, more optical sources or a tunable or broadband source may be used in the system to obtain a more detailed wavelength-dependent optical characterization of the amplifier assembly 76.

Light from lasers 84 and 86 may be combined into a single fiber 89 using a coupler such as wavelength division multiplexing coupler 88. Tap 91 may be used to tap a portion of the light in fiber 89. Tap 91 may be, for example, a wavelength-independent fused fiber tap. Light signals from tap 91 may be provided to amplifier assembly 76 via fiber 95, connector 78, and fiber 79. Tapped light from tap 91 may be provided to power meter 90 via fiber 93. Output signals from amplifier assembly 76 may be provided to power meter 90 via fiber 81, connector 80, and fiber 98.

Tapping the signal power from laser sources 84 and 86 allows the signal power used to perform the optical measurements to be normalized. The tapped signal power on fiber 93 may be calibrated in advance, so that the power in fiber 95 may be determined by measuring the power on fiber 93. The signal received at power meter 90 over fiber 98 may be normalized by dividing the received signal power by the power received via fiber 93. In the example of FIG. 4, power meter 90 has two ports. The first port is used to measure optical signals from fiber 98 and the second port is used to measure optical signals from fiber 93. This is merely illustrative. For example, the same signal port may be used to measure the power from both fiber 93 and fiber 98 using by measuring the powers at different times. Two separate power meters may also be used. The use of a power meter to measure the optical signals transmitted through amplifier assembly 76 is merely illustrative. Any photodetector or other suitable optical power monitoring device may be used if desired.

In a typical measurement arrangement, computer 82 directs laser 84 to output a probe signal and measures the resulting optical power on fiber 98. Computer 82 may normalize the transmitted power on fiber 98 using the tapped signal on fiber 93. Computer 82 then directs laser 86 to output a probe signal and measures the resulting optical power on fiber 98. This signal may also be normalized. The wavelengths of lasers 84 and 86 may be selected to be at nearly opposite ends of the usable gain spectrum of amplifier 18. For example, if amplifier 18 is a C-band amplifier operating in the 1530 nm to 1560 nm range, laser 84 may operate in the vicinity of 1530 nm and laser 86 may operate in the vicinity of 1560 nm.

Computer 82 may calculate the gain tilt of amplifier assembly 76 based on the known wavelengths of lasers 84 and 86 and based on the normalized transmitted signals on fiber 98 that are measured using power meter 90.

When measuring the amount of attenuation associated with a passive assembly, a measurement signal may be generated using a single wavelength (e.g., from laser 84) and the normalized transmitted power may be measured using power meter 90. Computer 82 may use the measured normalized value of the transmitted power to calculate the attenuation of the passive assembly.

Information on the measurements performed by the system of FIG. 4 may be displayed on display 92. The measurements may be used to make modifications to amplifiers during the process of manufacturing the amplifiers. Computer 82 may generate work orders based on the measurements. For example, a work order may be generated that directs a technician to add or remove a particular length of fiber from a fiber coil during assembly. Such work orders may be provided to technicians using any suitable equipment. For example, work orders may be printed on a printer 96 that is connected to computer 82 through network 94.

Figure 5:
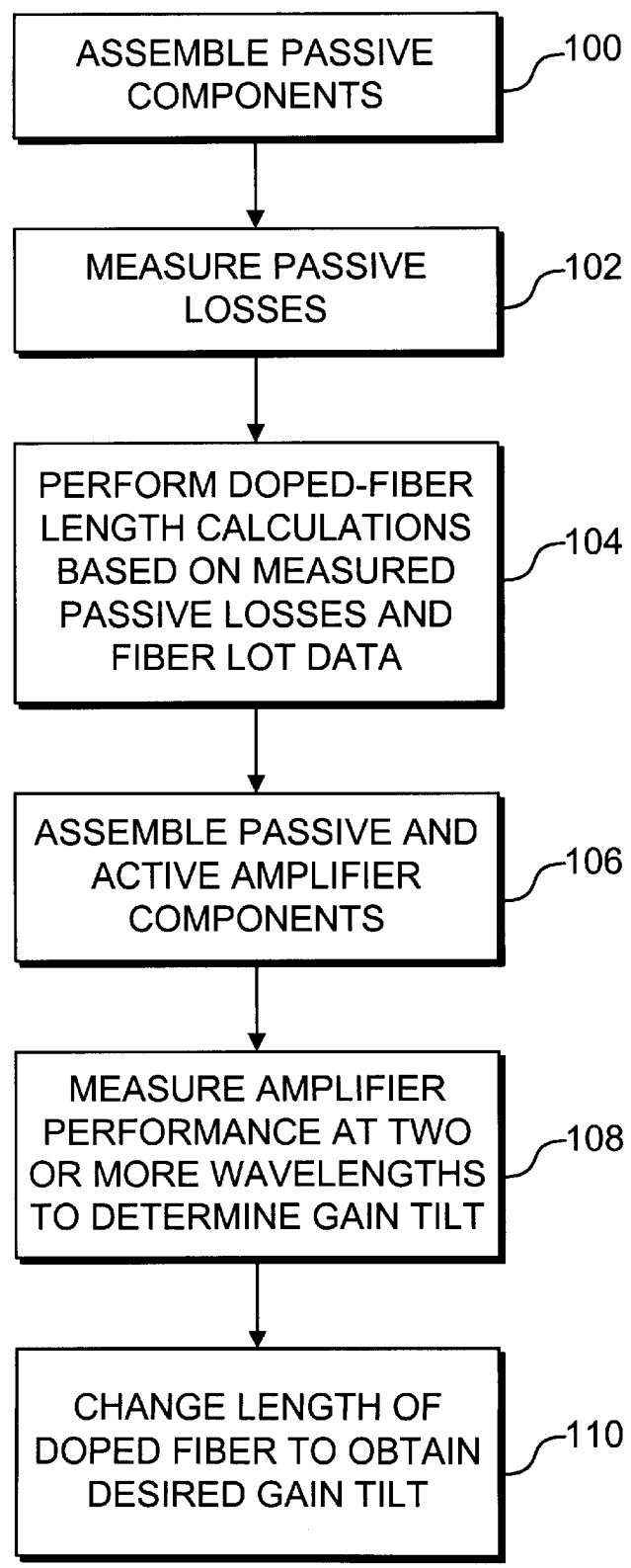
FIG. 5 is a flow chart of illustrative steps involved in manufacturing optical amplifiers in accordance with the present invention.

Illustrative steps involved in one approach for manufacturing optical amplifiers such as the optical amplifiers of FIGS. 2 and 3 using a measurement system of the type shown in FIG. 4 are set forth in FIG. 5. At step 100, the passive components of the amplifier may be assembled. For example, a fusion splicer may be used to splice together passive components such as taps 34 and 70, couplers 38, 42, 46, 58, and 66, gain equalization filter 56, variable optical attenuator 54, and isolators 44, 52, and 68. If desired, the components may be added incrementally (e.g., one at a time) and the losses associated with the assembly may be measured after each addition. This allows the additional loss associated with each new fusion splice and component to be measured and may be useful in isolating problems with particular components. The attenuation of the amplifier assembly may be measured using the measurement system of FIG. 4.

After all of the passive components have been added to the amplifier assembly, but before any doped fiber has been added, the loss associated with the complete passive amplifier assembly may be measured at step 102.

At step 104, computer equipment such as computer 82 may be used to perform doped-fiber length calculations based on the passive losses measured at step 102. The length calculations may also take into account the characteristics for the particular lot of fiber being used in assembling the amplifier. Lots of erbium-doped fiber are typically accompanied by data sheets from the fiber manufacturer. The data sheets may include information on the erbium doping concentration for the lot and information on various other physical and optical characteristics for the fiber in the lot. Step 104 may involve calculating the lengths for coils such as coils 40, 50, and 62 based on the measured losses associated with the passive amplifier components and the fiber lot data. For example, if the measured passive component losses are 1 dB higher than the nominal design expectation for the amplifier, then the lengths of the fiber coils that are used may be increased to create an additional 1 dB in gain. If the lot data indicates that the fiber lot being used has a lower than normal gain per unit length, then the length increases may be further increased accordingly. If the lot data indicates that the fiber lot being used as a higher than normal gain per unit length, then the magnitude of the length increases may be reduced accordingly.

If desired, the lot data need not be taken into account. The lengths of the doped fibers that are to be used in the amplifier may be calculated based only on the measured losses of the passive components.

At step 106, doped fiber coils of the appropriate lengths are combined with the passive components to form an amplifier assembly with both passive and active components. If desired, the lengths of the preamplifier and power amplifier stage may use nominal design lengths and the length of the mid-stage fiber may be used to absorb any changes in length from the nominal design lengths. A fusion splicer may be used to combine the passive and active components. Some of the splices used to connect the passive components may be replaced by new splices when the active components are added.

At step 108, the performance of the amplifier assembly may be measured at two or more wavelengths using, for example, a two-laser system of the type shown in FIG. 4. Computer 82 may determine the gain tilt of the assembly based on gain measurements made at each of the two wavelengths.

At step 110, the results of the measurements of step 108 may be used to make a final correction to the lengths of the doped fiber used in the amplifier assembly. Fiber may be added by inserting a splice and may be removed by cutting away a section of fiber and resplicing the remaining portions. The amount of the final correction may be calculated by computer 82 based on the amount of tilt correction expected per unit length of doped fiber. This amount may be based on fiber lot data or measured data. In an erbium-doped fiber amplifier arrangement having a mid-stage with a fiber coil, the length of the mid-stage coil may be adjusted by adding a fiber splice to the coil or by removing a length of fiber from the coil. If desired, all of the corrections to the fiber lengths may be made to a single mid-stage coil, rather than adjusting the lengths of each fiber. The completed amplifier may be tested after the final length change of step 110 and further corrections made if necessary.

When assembling the passive components at step 100, the variable optical attenuator (if used) may be set to either produce its minimum attenuation (e.g., 0 dB) or may be set to produce a relatively small fixed amount of attenuation (e.g., 1–2 dB).

If the attenuation of the variable optical attenuator is set at 0 dB, corrections to the gain tilt of the amplifier may be made by adding or removing doped fiber from the amplifier. The gain tilt of the amplifier may also be adjusted by increasing the attenuation setting of the variable optical attenuator. If desired, for example, the nominal fiber length may be designed so that the it is expected that small amounts of attenuation will always need to be added after the gain tilt measurements have been made.

If the attenuation of the variable optical attenuator is set at a small fixed loss value (e.g., 1–2 dB), the gain tilt of the amplifier may be adjusted by increasing or decreasing the attenuation setting of the variable optical attenuator.

Using the variable optical attenuator or other suitable passive attenuator to make adjustments to the amplifier may reduce or eliminate the need to make fiber length changes during the manufacturing process.

Figure 6:
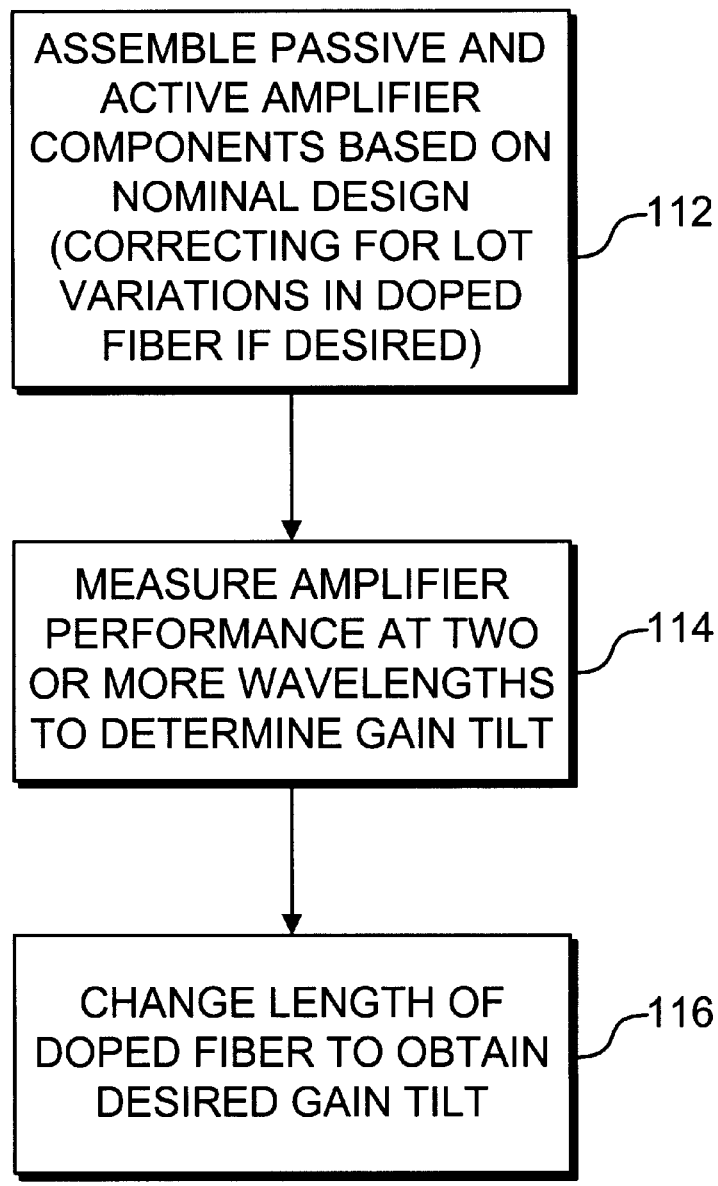
FIG. 6 is another flow chart of illustrative steps involved in manufacturing optical amplifiers in accordance with the present invention.

If desired, all of the active and passive components of the amplifier may be assembled based on a nominal design and subsequent testing and corrections may be performed to ensure that the amplifier meets design expectations. Illustrative steps involved with this approach are shown in FIG. 6.

At step 112, the passive and active amplifier components may be assembled based on the nominal design for the amplifier. If lot data is available for the doped fiber that is being used, the lengths of the fiber may be adjusted before assembly based on the lot data.

At step 114, the performance of the amplifier may be measured. In particular, the gain tilt of the amplifier may be measured using a measurement system such as the system of FIG. 4.

At step 116, the length of the doped fiber used in the amplifier may be changed to obtain the desired gain tilt. Computer equipment such as computer 82 may be used to calculate how much fiber should be added or removed from the amplifier to achieve the desired tilt adjustment. If desired, the fiber length change may be made entirely in the amplifier mid-stage. Length increases may be accomplished by splicing in the appropriate length of additional fiber to the coil. Length decreases may be accomplished by removing the appropriate length of fiber from the coil and resplicing the ends of the remaining fiber.

In general, there is a random distribution in the variations of the losses associated with passive components. There is also a random distribution in the variations of the gains associated with the doped fiber components. If the amplifier components are assembled according to the nominal design specification, then some of the length changes that are required will be length additions and some of the length changes that are required will be length reductions.

Figure 7:
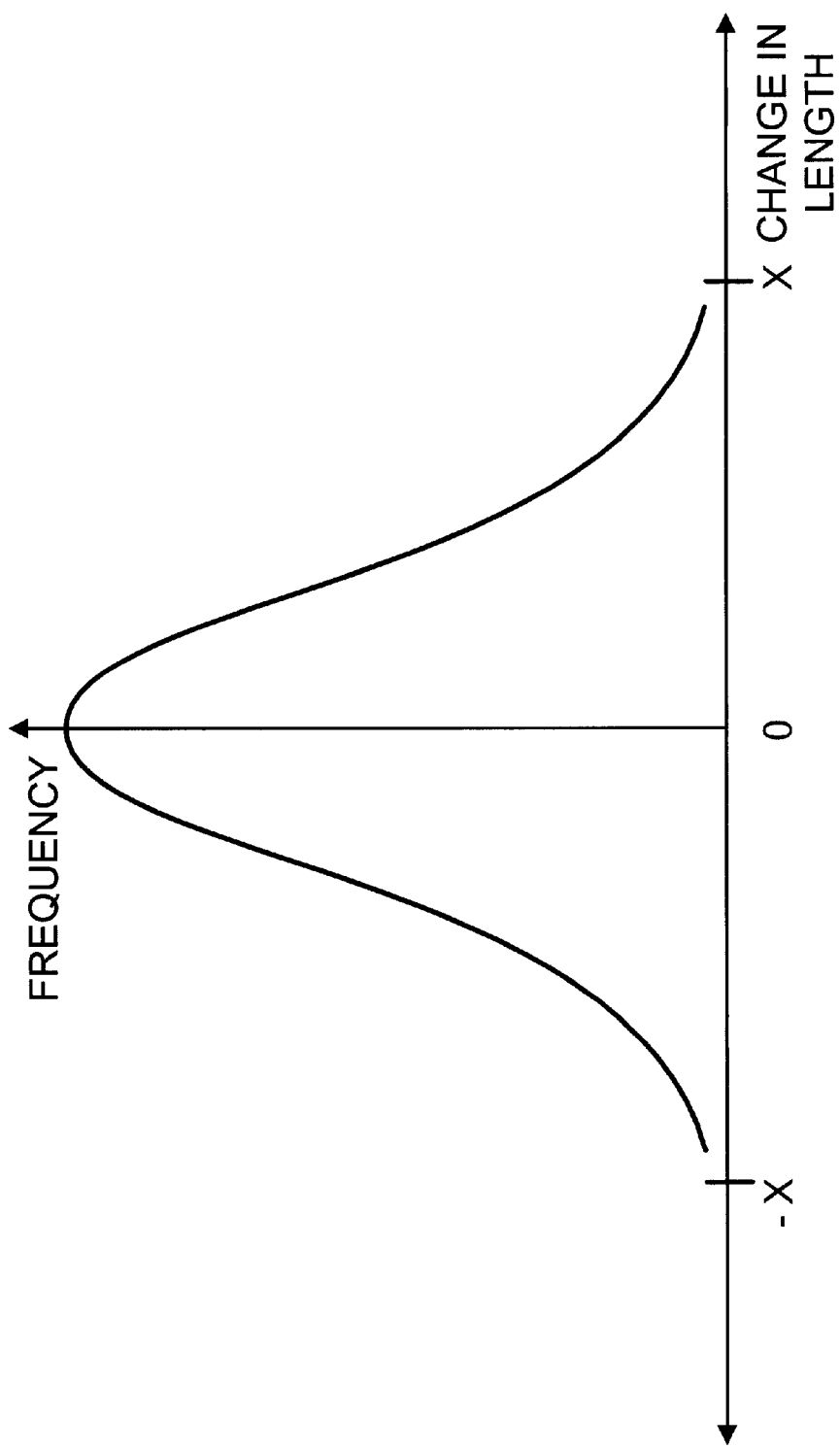
FIG. 7 is a population distribution graph showing the types of doped-fiber length changes that may typically be encountered when fabricating an amplifier in accordance with the present invention.

An illustrative population distribution graph is shown in FIG. 7. In the example of FIG. 7, most length changes are less than x meters in length. The value of x is generally on the order of a meter to several meters in length for amplifier designs in which the total doped fiber length is on the order of one hundred meters. If the amplifier components are assembled based on a design specification that attempts to minimize the magnitude of any length changes, approximately half of the length changes will be length additions and half of the length changes will be length reductions.

If desired, the initial assembly process may involve constructing amplifier assemblies that always have an extra length (e.g., a length x) of doped fiber relative to the nominal design length. With this approach, length reductions will nearly always be required, but no length additions will be required.

Similarly, the initial assembly process may involve constructing amplifier assemblies in which there is a length (e.g., a length x) of doped fiber missing from the coil relative to the nominal design length. With this approach, length additions will nearly always be required, but length reductions will not be required.

These approaches for biasing the nominal design to control which types of length changes will be required during assembly may be used with any suitable fiber amplifier manufacturing techniques such as the manufacturing techniques of FIGS. 5 and 6.

Figure 8:
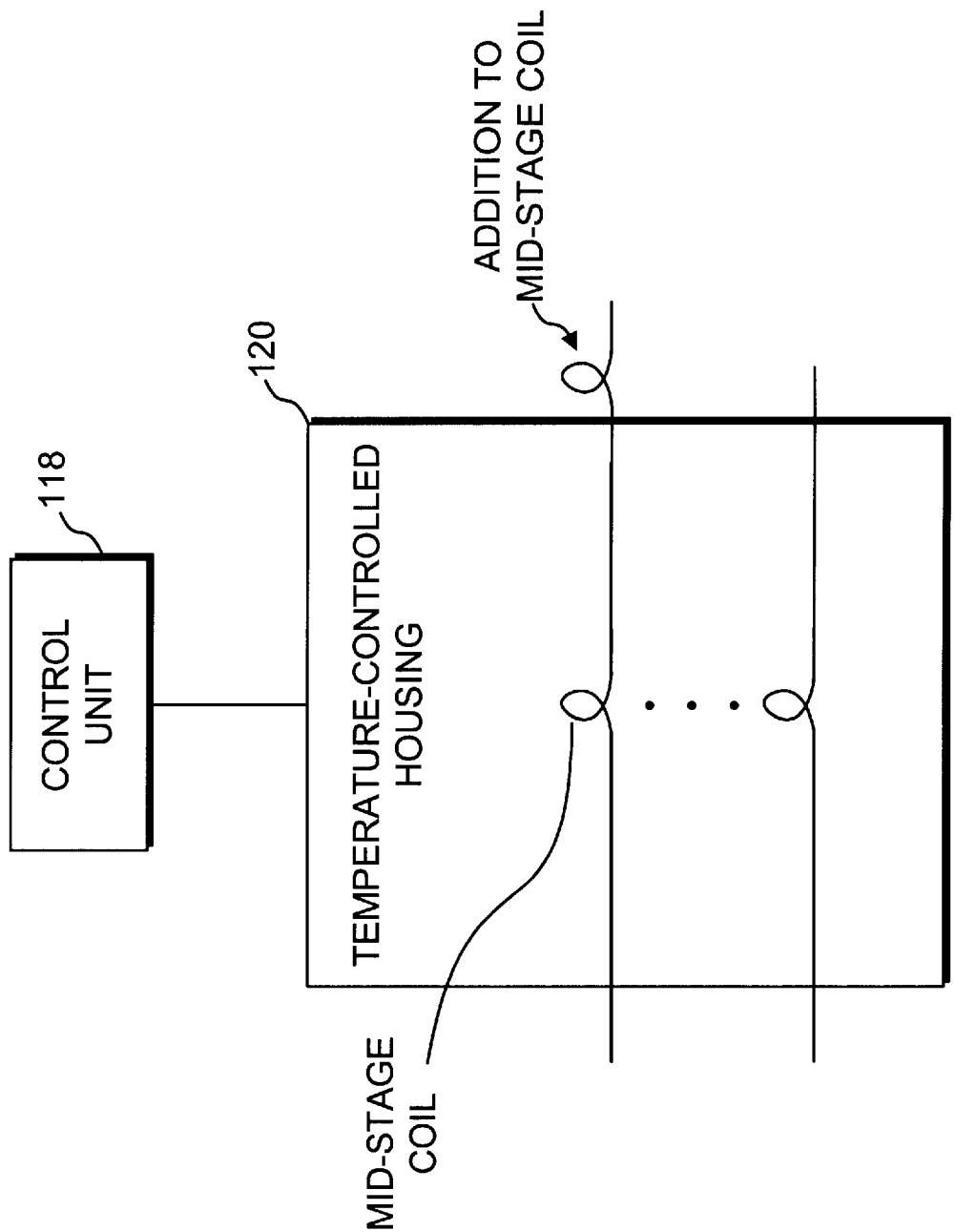
FIG. 8 is a schematic diagram showing how fiber length changes may be made to a mid-stage coil by adding fiber to a portion of the fiber amplifier that is outside of a temperature-controlled housing.

Doped fibers for the amplifiers 18 may be mounted in a temperature-controlled housing to reduce noise effects. As shown in FIG. 8, a control unit 118 may be used in an amplifier 18 to control the temperature in temperature-controlled housing 120. Control unit 118 may control the housing temperature using heaters to heat the housing to a relatively high constant temperature (e.g., 60 to 70 C) or may use thermo-electric cooling elements to control the housing temperature to room temperature (e.g., 20 C) or any other relatively low constant temperature.

Fiber lengths may be adjusted before or after the fibers are mounted in the temperature-controlled housing. If desired, fiber length additions may be made by adding an appropriate length of doped fiber to the fiber path at a location outside of the housing, as shown in FIG. 8. Even though the additional fiber is not inside the housing, the fractional length that is outside of the housing will typically be small (e.g., about 1–3% of the total fiber length or less). Accordingly, placing the additional fiber outside of the temperature-controlled housing will generally have a negligible impact on the temperature dependence of the noise characteristics of the amplifier.

Figure 9:
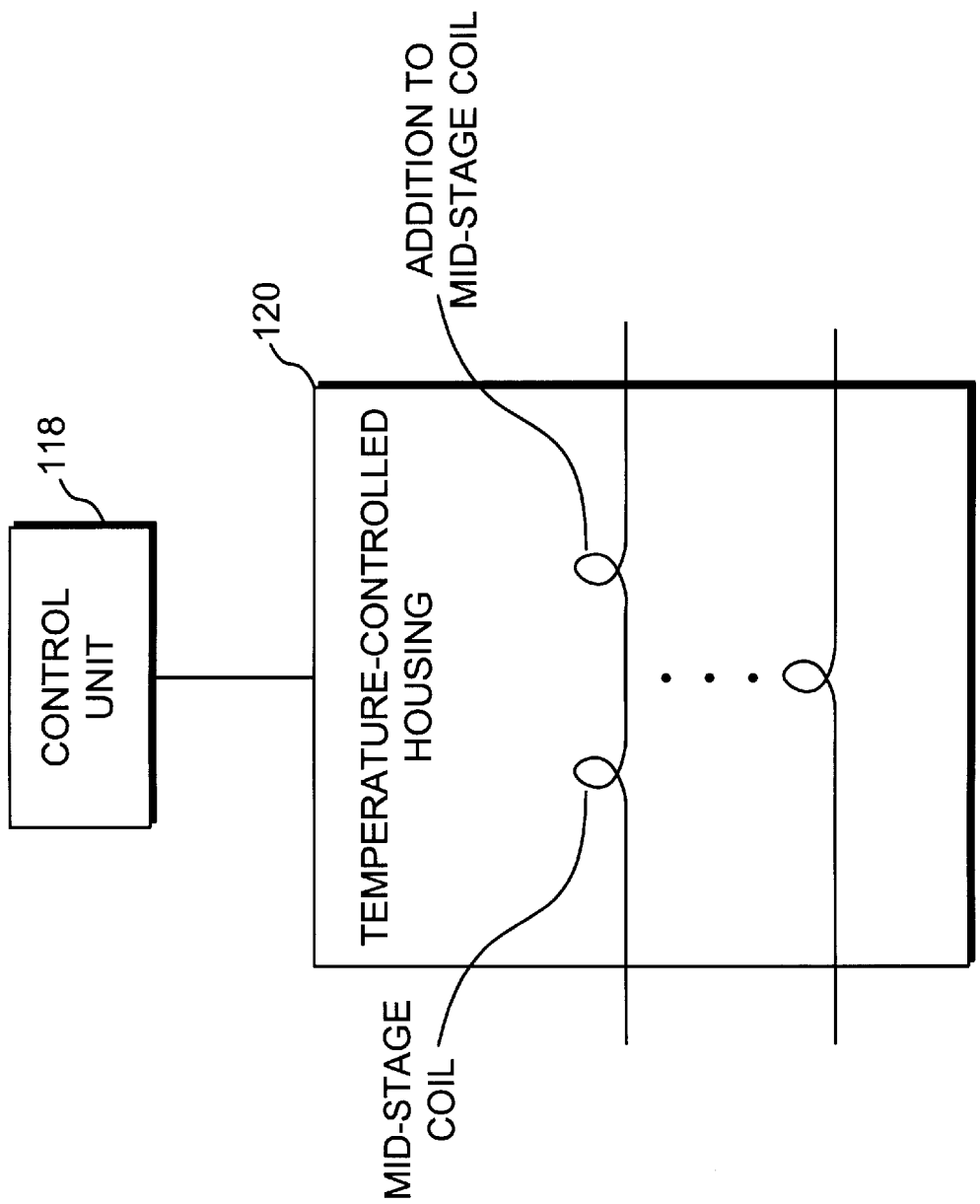
FIG. 9 is a schematic diagram showing how fiber length changes may be made to a mid-stage coil by adding fiber to a portion of the fiber amplifier that is inside a temperature-controlled housing.

If desired, fiber length additions may be mounted inside the housing 120, as shown in FIG. 9. If fiber length additions are made inside the housing or if fiber length reductions are anticipated, the fiber coil to be modified (e.g., the mid-stage coil) is preferably not permanently mounted in housing 120 until the correction has been made.

It will be understood that the foregoing is merely illustrative of the principles of this invention, and that various modifications can be made by those skilled in the art without departing from the scope and spirit of the invention. For example, any suitable rare-earth-doped fiber or other gain medium may be used for the active portions of the amplifiers.

What is claimed is:

1. A method for manufacturing a fiber amplifier having a plurality of active and passive components having nominal optical characteristics and actual optical characteristics comprising:

assembling the active and passive components, wherein the active components include at least one rare-earth-doped fiber coil;

measuring the actual optical characteristics of the assembled active and passive components; and making at least one rare-earth-doped fiber length adjustment for the amplifier based on variations of the measured actual optical characteristics of the active and passive components from the nominal optical characteristics of the active and passive components to correct for gain tilt variations in the amplifier that are due to the variations of the actual optical characteristics of the active and passive components from the nominal optical characteristics of the active and passive components.

2. The method defined in claim 1 wherein assembling the active and passive components comprises assembling both the active and passive components together at once.

3. The method defined in claim 1 wherein the active components comprise multiple coils of rare-earth-doped fiber and wherein assembling the active and passive components comprises:

assembling the passive components before the active components;

characterizing passive losses in the assembled passive components; and calculating the lengths of the coils based on the characterized passive losses of the assembled passive components.

4. The method defined in claim 1 further comprising making a gain tilt measurement on the assembled active and passive components.

5. The method defined in claim 1 further comprising:

making a gain tilt measurement on the assembled active and passive components; and making the fiber length adjustment based on the gain tilt measurement.

6. The method defined in claim 1 wherein making the length adjustment comprises adding at least one length of rare-earth-doped fiber to the assembled passive and active components.

7. The method defined in claim 1 wherein making the length adjustment comprises removing at least one length of rare-earth-doped fiber from the assembled passive and active components.

8. The method defined in claim 1 wherein the active components include a plurality of rare-earth-doped fiber coils and wherein making the length adjustment involves adding at least one length of rare-earth-doped fiber to one of the plurality of rare-earth-doped fiber coils.

9. The method defined in claim 1 wherein the active components include a plurality of rare-earth-doped fiber coils, the method comprising placing the rare-earth-doped fiber coils in a temperature-controlled housing, wherein making the length adjustment comprises adding at least one length of rare-earth-doped fiber to the assembled passive and active components outside of the temperature-controlled housing.

10. The method defined in claim 1 wherein the active components comprise a plurality of optically-pumped rare-earth-doped fiber coils, and wherein making the length adjustment comprises changing the length of only one of the rare-earth-doped fiber coils.

11. The method defined in claim 1 wherein the active components include first and last rare-earth-doped fiber coils, the method further comprising making fiber length adjustments to rare-earth-doped fiber in the amplifier between the first and last fiber coils.

12. The method defined in claim 1 wherein the active components include multiple rare-earth-doped fiber coils and wherein making the length adjustment includes splicing an additional length of rare-earth-doped fiber to at least one of the coils.

* * * * *